US011445662B2

(12) United States Patent
Donaldson et al.

(10) Patent No.: US 11,445,662 B2
(45) Date of Patent: Sep. 20, 2022

(54) HOP PICKING FINGER

(71) Applicant: Virgil Gamache Farms, Inc., Toppenish, WA (US)

(72) Inventors: Jeff Donaldson, Tigard, OR (US); Darren Gamache, Wapato, WA (US)

(73) Assignee: Virgil Gamache Farms, Inc., Toppenish, WA (US)

( * ) Notice: Subject to any disclaimer, the term of this patent is extended or adjusted under 35 U.S.C. 154(b) by 77 days.

(21) Appl. No.: 16/880,666

(22) Filed: May 21, 2020

(65) Prior Publication Data

US 2021/0360854 A1 Nov. 25, 2021

(51) Int. Cl.
*A01D 46/02* (2006.01)

(52) U.S. Cl.
CPC .................................. *A01D 46/02* (2013.01)

(58) Field of Classification Search
CPC ...... A01D 46/02; A01D 45/003; A01D 45/16; A01D 45/22; A01D 45/24; A01D 46/06
See application file for complete search history.

(56) References Cited

U.S. PATENT DOCUMENTS

| | | | | | |
|---|---|---|---|---|---|
| 1,008,914 | A | * | 11/1911 | Horst | A01D 46/02 460/126 |
| 2,187,526 | A | * | 1/1940 | Thys | A01D 46/02 460/125 |
| 2,226,813 | A | * | 12/1940 | Gray | A01D 46/02 460/126 |
| 2,428,321 | A | * | 9/1947 | Rivard | A01D 46/02 460/128 |
| 2,448,063 | A | * | 8/1948 | Thys | A01D 46/02 460/134 |
| 2,699,172 | A | * | 1/1955 | Regimbal | A01D 46/02 460/129 |
| 2,750,945 | A | * | 6/1956 | Crowley | A01D 46/02 460/129 |
| 2,764,163 | A | * | 9/1956 | Thys | A01D 46/02 460/128 |
| 2,905,183 | A | * | 9/1959 | Thurmer | A01D 46/02 460/128 |
| 4,276,738 | A | * | 7/1981 | Ferraro | A01D 46/02 56/130 |
| 4,913,680 | A | * | 4/1990 | Desmarais | A01D 46/02 180/414 |
| 2012/0083321 | A1 | * | 4/2012 | Fu | A01D 46/02 460/126 |
| 2016/0330908 | A1 | * | 11/2016 | Bonzo | A01D 46/02 |

FOREIGN PATENT DOCUMENTS

DE 202018005526 U1 * 1/2019 ............ A01D 46/02

OTHER PUBLICATIONS

University of Vermont, The UVM Mobile Hop Harvester, Jan. 8, 2013.*

* cited by examiner

*Primary Examiner* — Adam J Behrens
(74) *Attorney, Agent, or Firm* — Michelle Bos Legal LLC

(57) ABSTRACT

An improved hop picking finger for use in automated hop harvesting equipment, formed from a single length of wire and having a first leg and a second leg, each leg comprising an upper segment, a middle segment, a lower segment and a helical spring between the middle and lower segments. The ratio of the lengths of the middle segment and lower segment to the helical spring diameter increases wear resistance and decreases stress breaks. An array of non-interlocking, non-overlapping hop picking fingers removably secured to a hop harvester finger bar.

2 Claims, 4 Drawing Sheets

HOP PICKING FINGER

BACKGROUND OF THE INVENTION

The present invention relates to hop harvesting and processing equipment, and more particularly to the picking fingers that separate the hop strobiles, often referred to as cones, from the bine, leaves and arms of a hop plant during the picking process.

Automated hop harvesting is well known in the art. Various equipment and methods have been disclosed for processing hop bines, including steps to remove the bines from the trellis on which they grow and to remove the plant material, comprising hop cones, leaves and arms, from the bines. Many hop harvesters use a well-known "raking" action to remove plant material from vertically hanging, intact bines. The plant material removed from the bines by the raking device must be further processed to separate the valuable hop cones from the other plant material. The equipment often used to accomplish this separation step is known as an "upright, main picker," "arm picker" or more simply, a "picker."

A raking device commonly used in hop harvesting is comprised of multiple arrays of individual picking fingers secured in rows on a finger bar on a rotating drum or endless chain belt. The picking fingers employed in known raking devices are often the same design as the picking fingers employed in the picker. Examples of known hop harvesters and picking fingers can be seen in U.S. Pat. Nos. 2,114,727 and 2,211,357 to Thys; U.S. Pat. No. 2,226,813 to Gray; U.S. Pat. No. 2,428,321 to Rivard et al.; U.S. Pat. No. 2,447,122 to Horst; and U.S. Pat. No. 4,276,738 to Ferraro. Further examples include picking fingers manufactured by Dauenhauer Mfg. Co, Inc. and Wolf Hop Harvesters.

Recent advances in hop harvesting technology have eliminated the step of raking the hop bine to prepare plant material for the picker. For example, U.S. Pat. No. 6,769,981 to Perrault discloses a device and method for cutting and shredding hop vines into smaller segments. These smaller segments do not require raking and can go directly to the picker.

Despite the advances in harvesting technology, the picking fingers presently available for pickers continue to be those that were originally designed for raking devices in harvesters. In addition to not being ideally suited for picking applications, currently known picking fingers have a limited life span. Repeated deflection of each picking finger results in wear points, and eventually breakage of the picking finger. Some known picking fingers are designed to overlap or interlock on the finger bar, which may add resilience and eliminate wear when used in the raking device of a conventional harvester. When used in a picker, however, the points of contact become wear points prone to breakage. Additionally, known picking fingers have a limited range of deflection, which under modern applications is routinely exceeded, thus making breakage more likely.

When one or more picking fingers on the finger bar must be replaced the picker must be shut down, leading to lost time and added expense. A need therefore exists for an improved picking finger that addresses the limitations described herein.

DETAILED DESCRIPTION OF THE INVENTION

Figure 1:
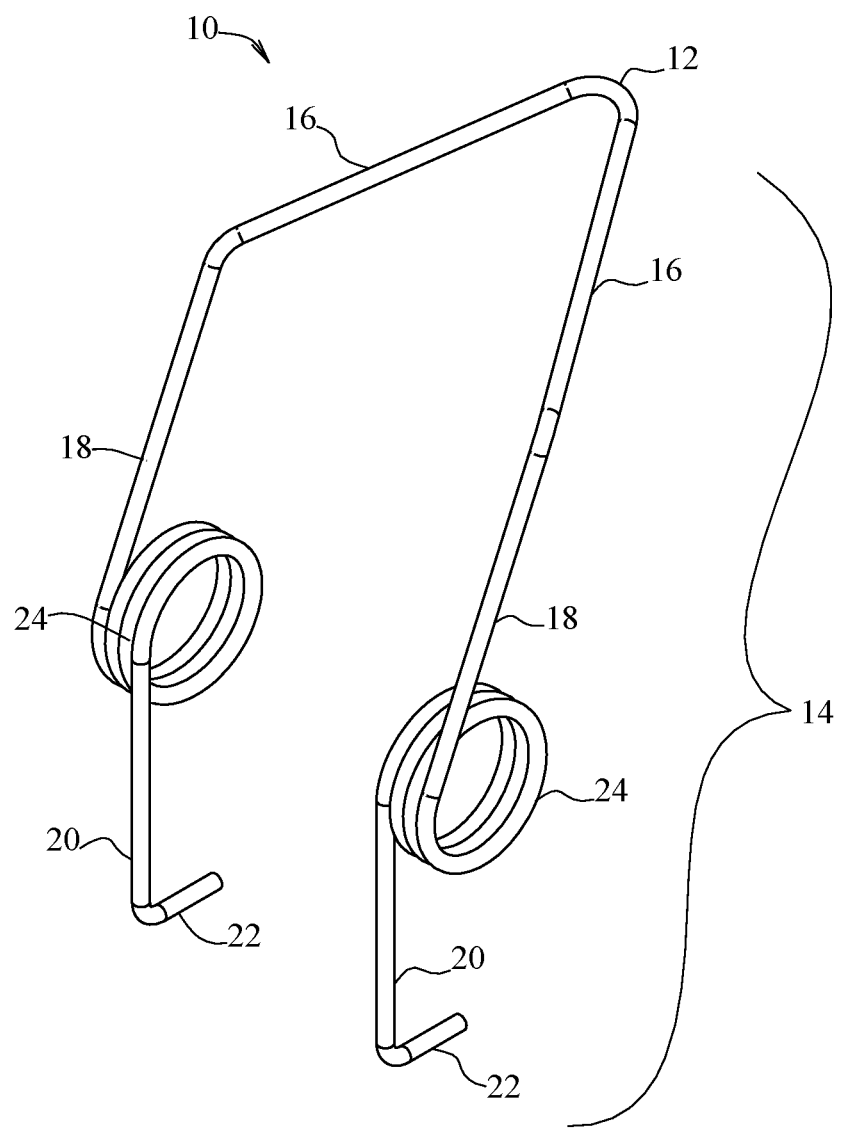
FIG. 1 is a perspective view of a picking finger according to the invention.
Figure 2:
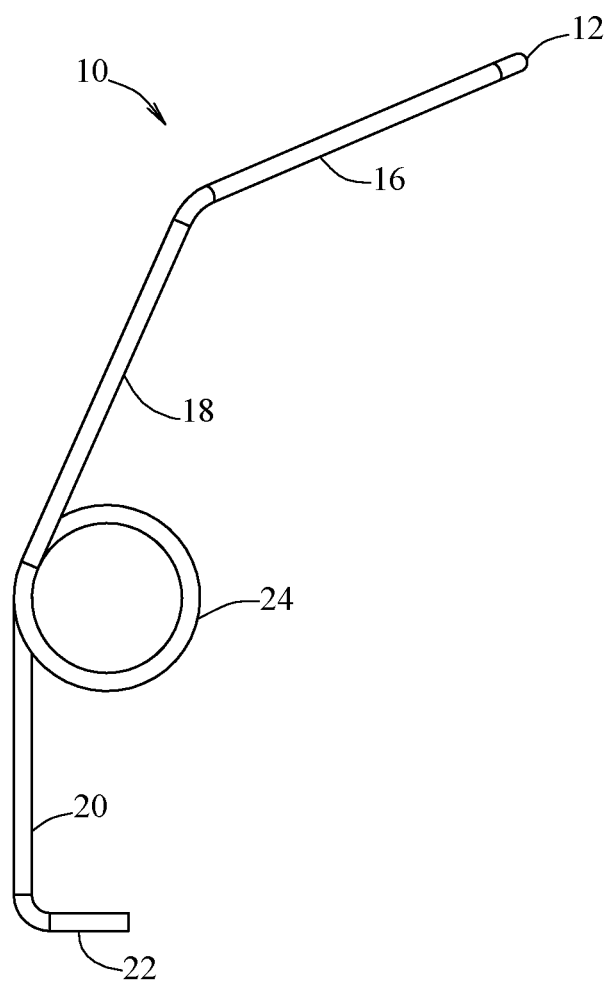
FIG. 2 is a side view of a picking finger according to the invention.
Figure 3:
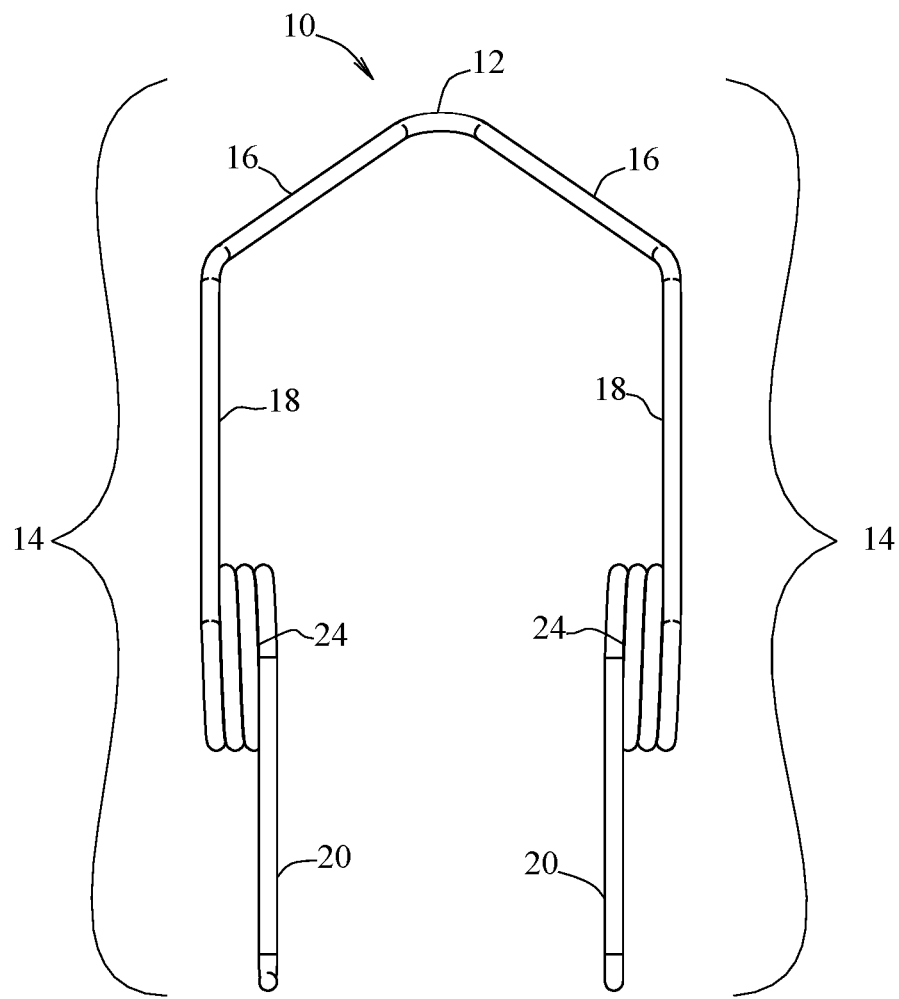
FIG. 3 is a plan view of a picking finger according to the invention.

The invention disclosed herein is a picking finger 10 for use in a hop harvesting or hop picking apparatus, for simplicity referred to herein as a picker. The picking finger is formed from a single piece of steel wire. As shown in FIG. 1, the picking finger comprises a unitary wire body having a substantially V-shaped tip 12 and two legs 14. Each leg comprises an upper segment 16, a middle segment 18, a lower segment 20 and a foot segment 22. The two upper segments form the angled sides of the V-shaped tip, while the middle, lower and foot segments are parallel to one another, as best seen FIG. 3. A helical spring 24 is formed between the middle and lower segments of each leg. Preferably, the helical spring comprises three coils extending into the space between the two legs. The pair of helical springs allow the picking finger to flex and spring back when pressure is applied to the V-shaped apex of the picking finger. The foot segment extends approximately perpendicularly from the lower segment, and is used to anchor or attach the picking finger to the finger bar 26, as is understood in the art and shown in FIG. 4.

The improved picking finger 10 of the present invention is intended for use in existing pickers. The overall height and width dimensions of the improved picking finger are therefore the same as those of existing picking fingers so as to be interchangeable therewith. The novelty of the present invention lies in advantages discovered by the inventor in the relative dimensions of the wire used to form the picking finger 10, the diameter of the helical spring 24, and the length of the middle segment 18 and lower segment 20 of each leg 14.

In a preferred embodiment of the invention, the lower segment 20 of the leg 14 has a length that is approximately two times the diameter of the helical spring 24. The middle segment 18 has a length that is approximately two and half times the diameter of the helical spring. In practice, this ratio translates to a helical spring diameter 0.875 inches, a lower segment length of approximately 1.7 inches, and a middle segment length of approximately 2.2 inches. By comparison, the lower segment is longer and the middle segment is shorter than in known picking fingers, which have a helical spring diameter of 0.625, a lower segment length of 1.5 inches, and a middle segment length of 2.5 inches.

Preferably, the single length of steel wire used to form the picking finger 10 is ASTM228 music wire having a diameter of about 0.094 inches.

Figure 4:
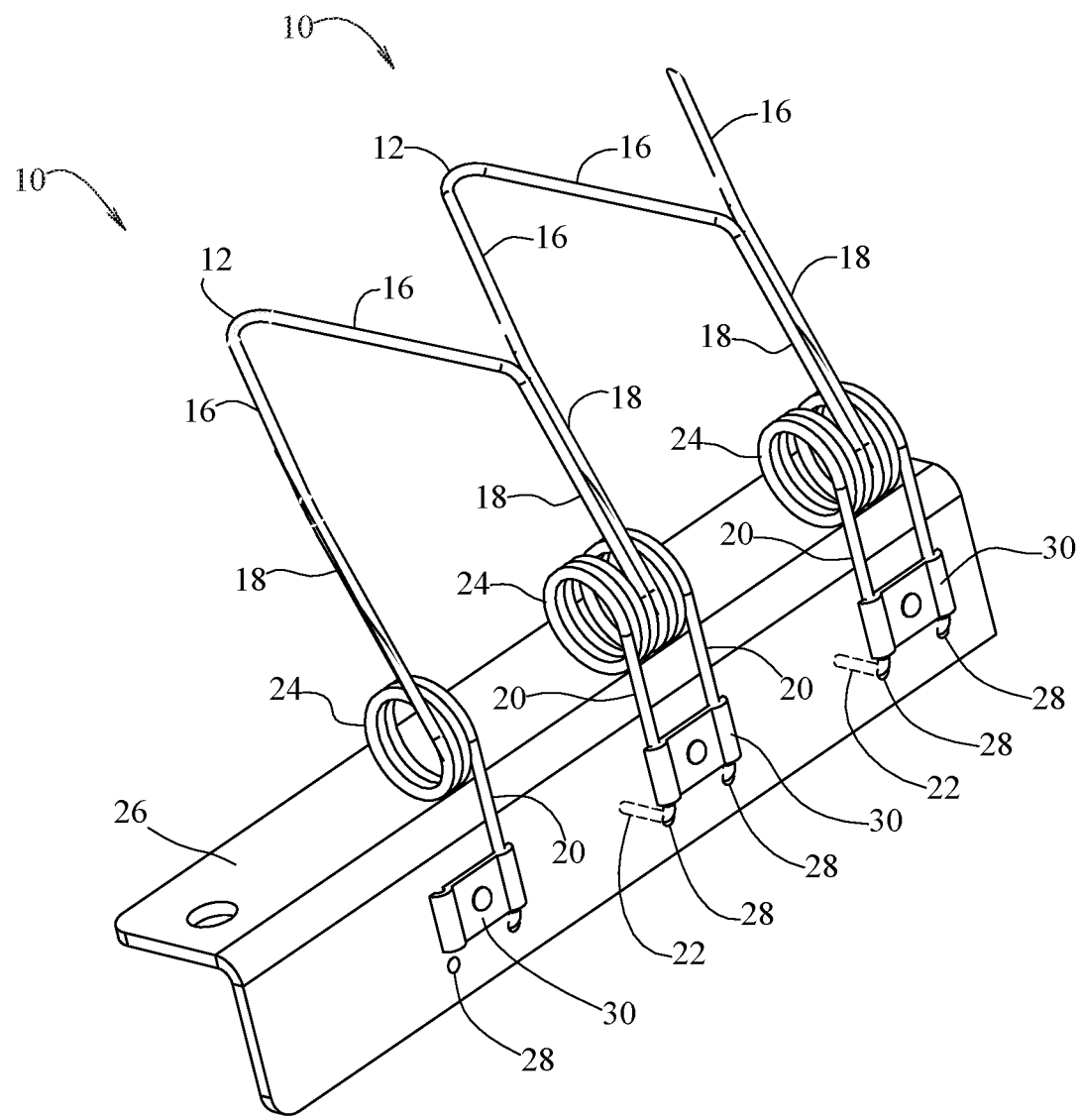
FIG. 4 is a perspective view of a portion of a finger bar with a plurality of picking fingers attached thereto.

In use, picking fingers 10 are removably affixed to the finger bar 26, as shown in FIG. 4. In a preferred embodiment of the invention, a plurality of apertures 28 in the finger bar are adapted and arranged to receive the foot 22 of each leg 14 of each picking finger. A clamp 30 positioned over the lower segments 20 of adjacent legs is riveted or otherwise affixed to the finger bar to secure the picking fingers in place. As can be seen in the illustration, the arms of consecutive picking fingers are adjacent, but not overlapped or interlocked. Consequently, a single picking finger can be replaced without removing or disrupting the remaining picking fingers on the finger bar.

A picking finger having the relative dimensions described herein has been found to have higher wear resistance over repetitive use cycles and have fewer stress breaks and fretting failures than picking fingers currently known in the art. When used in a picker, a plurality of hop picking fingers 10 as disclosed herein have been found by the inventor to be durable, effective at separating hop cones from other plant material, and simple to remove one at a time when replacement is required.

In compliance with the statutes, the invention has been described in language more or less specific as to structural features and process steps. While this invention can be embodied in different forms, the specification describes and illustrates the preferred embodiment of the invention. It is to be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims.

The invention claimed is:

1. An improved hop picking finger formed from a single length of wire, the hop picking finger comprising: a substantially V-shaped apex, a first leg and a second leg, the first leg and the second leg each having a helical spring formed therein so as to allow the picking finger to flex and spring back when pressure is applied to the V-shaped apex, wherein:
    the first leg and the second leg each comprising a contiguous upper segment and middle segment, and a lower segment;
    the upper segments form the angled sides of the V-shaped apex;
    the helical spring is formed between the middle segment and the lower segment of each leg; and,
    wherein the length of each leg middle segment is two and a half times the diameter of the helical spring, plus or minus one-tenth of an inch; and the length of each leg lower segment is two times the diameter of the helical spring, plus or minus one-tenth of an inch.

2. A plurality of the hop picking fingers of claim 1, arranged along a hop harvester finger bar in a non-interlocking, non-overlapping array such that the second leg middle segment of one hop picking finger is parallel and adjacent to the first leg middle segment of the next hop picking finger, wherein each hop picking finger is removably affixed to the finger bar.

* * * * *